April 11, 1967   M. FELCHECK   3,314,049
ELECTRONIC ORDERING, COMPUTING AND BILL-PRINTING SYSTEM
Filed July 23, 1963   8 Sheets-Sheet 3

INVENTOR
MARVIN FELCHECK
BY
*Stewart F. Moore*
ATTORNEY

April 11, 1967 M. FELCHECK 3,314,049
ELECTRONIC ORDERING, COMPUTING AND BILL-PRINTING SYSTEM
Filed July 23, 1963 8 Sheets-Sheet 4
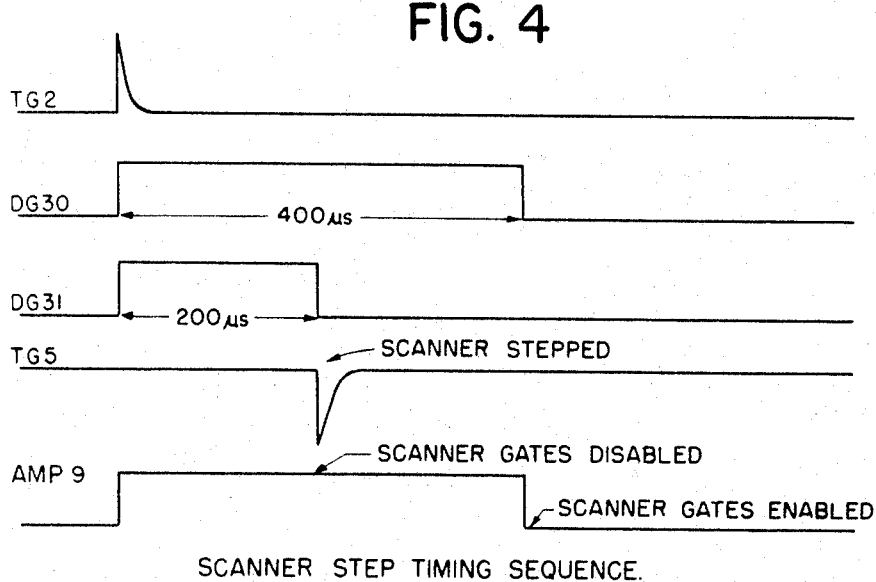
SCANNER STEP TIMING SEQUENCE.
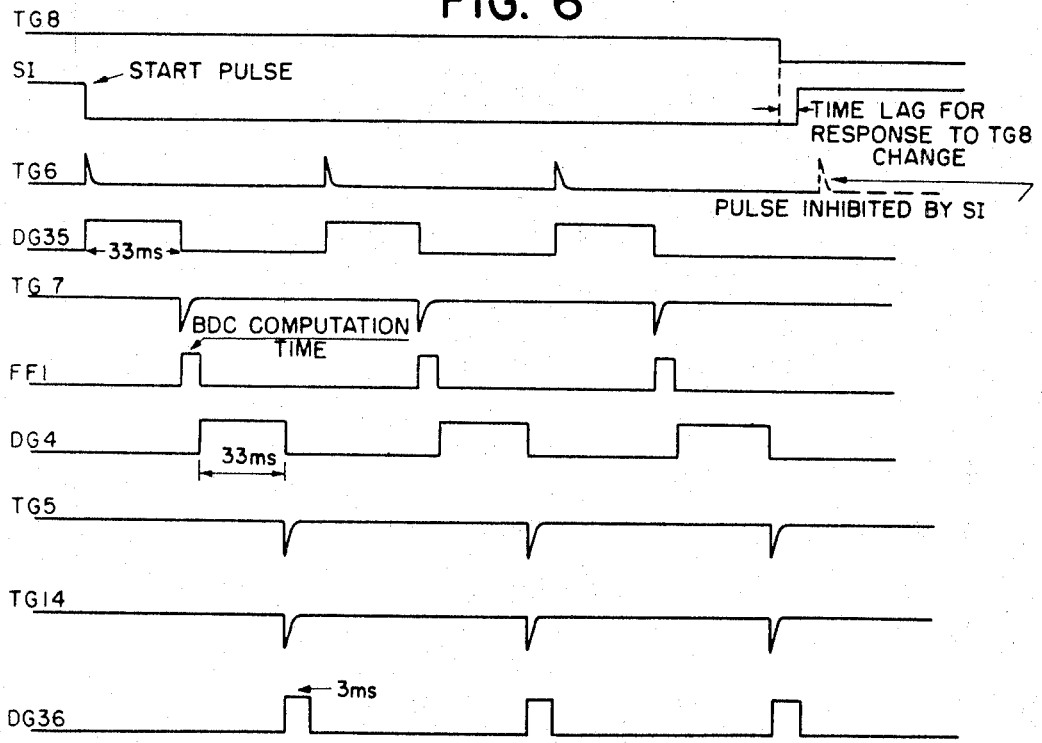
TIMING SEQUENCE OF COMMAND LOGIC
INVENTOR
MARVIN FELCHECK
BY
*Stuart F. Moore*
ATTORNEY

INVENTOR
MARVIN FELCHECK
BY
ATTORNEY

United States Patent Office 3,314,049
Patented Apr. 11, 1967

3,314,049
ELECTRONIC ORDERING, COMPUTING AND
BILL-PRINTING SYSTEM
Marvin Felcheck, Bayside, N.Y., assignor to American Machine & Foundry Company, a corporation of New Jersey
Filed July 23, 1963, Ser. No. 297,118
4 Claims. (Cl. 340—172.5)

The invention relates to data processing systems and particularly to computing equipment used in such a system and the associated electronic control arrangements.

The computing equipment and associated electronic control arrangements of the invention were devised for and used in an ordering, price computing and billing system for an automated restaurant of the drive-in type, disclosed in the co-pending U.S. Patent application of Alpert, Berler and Townsend, Ser. No. 219,222, filed Aug. 8, 1962, now Patent 3,267,436 which issued Aug. 16, 1966. This system utilizes a single push button-controlled computer operative on a time-sharing basis, and capable of control by a single operator, to perform all of the ordering, price computing and billing operations involved in the sale of different orders to customers of a number of selected food commodities normally sold in restaurants of this type, to produce information in electric pulse form on the quantity of items sold on each individual order, the total item and order price and other order information; and to utilize this pulse information to operate an electro-mechanical printer to produce a customer's bill containing all this information in suitable printed form. Also, the disclosed system produces back order signals and utilizes them to operate inventory controls and equipment in the automatic kitchen of the restaurant.

A general object of the invention is to improve the control arrangements of a system of this type from the standpoint of economy of apparatus, speed and efficiency of operation, low maintainence costs and relatively small space requirements.

A related general object is to provide efficiently and economically the automatic control of certain component elements of the system disclosed in the aforementioned application to accomplish certain desired purposes.

A more specific object is to provide the necessary signals for time-sharing the binary to decimal conversion, the drive for the menu item memory devices controlling the automatic apparatus in the automatic kitchen of the restaurant, and the command logic for driving the printer, in the system of the aforementioned application.

Another specific object is to provide a technique for supplying control information to, and receiving control information from, the printer through the command logic in such a system.

Another object is to provide a technique for programming a computer via a scanner type of operation.

Another object is to provide a time-shared item quantity accumulator in such a system.

Other specific objects are to provide the scanner-stepping, gate-sampling and switch-disabling techniques in such a system.

The basic concept and philosophy of the all-electronic ordering, price computing and billing system in which the above objects are attained is to use one basic computer on a time-sharing basis to do the job of thirty or more different computers with greater reliability and economy. The system has no moving parts other than control and order push buttons and the printers with which it is used. All computing and other control functions are performed by solid state devices. Since the system uses all long-life electronic components, greater speed and reliability are possible than could be obtained by the use of mechanical or electromechanical units. It is capable of operation over long periods of time with a minimum of maintenance.

The computer as disclosed in the aforementioned Alpert et al. application includes in combination with a suitable printer for printing customer bills, a plurality of ring counter memory devices utilized for entering into the computer the quantity of different commodity items ordered on an order from a customer; an item scanner; a price blank diode matrix which in combination with the item quantity memory devices present a binary representation of each item price sampled by the scanner; a binary to decimal converter; a plurality of accumulators for respectively accumulating and storing information on the quantity and total price of each of the order items; back order signal producing means for controlling through external circuitry the food dispensing devices and inventory controls in an associated automatic kitchen; and command logic equipment and associated switching controls for the computer.

The control equipment of this system with which the present invention is particularly concerned is in essence the "brain" of this computer in that it controls the many functions performed thereby. For example, through proper stepping of the item scanner, use for scanning or sampling the output of the memory devices, the specific operation, as well as the number of operations, of a number of other control devices in the computer, is pre-programmed. Also, the sequence of operations in the computer is controlled by the item scanner.

This equipment has provisions for time sharing the binary to decimal converter, the control for the dispensing devices in the associated automatic kitchen, the item quantity accumulator and the command logic for driving the printer. Also, the logic control equipment under control of the operator supplies the necessary signals for operating an external printer in desired manner; for example, to print price information or to advance the customer's bill without printing if no item prices are to be printed, and to provide automatic cutting off of the bill; and to perform other necessary functions, such as disabling the switches connecting order controls with the ring counters in the item memory devices after an order has been confirmed, and providing automatic system reset when the computer is turned on by the operator.

A feature of the invention is the count-down chain between the binary to decimal converter and the block of memory devices in which order information is inserted; in particular, this chain supplies the proper "initiation converson" signal in proper time relation to the price informaton to the converter, and utilizes a "conversion complete" signal to count down the ring counter in the item quantity memory devices, and inhibits operation of the chain at the proper time.

The above and other objects and features of the invention will be better understood from the following detailed description thereof when it is read in conjunction with the various figures of the accompanying drawings in which:

FIG. 4 shows waveforms illustrating the item scanner step timing sequence under control of the associated apparatus of the command logic shown in FIG. 3;

Figure 1:
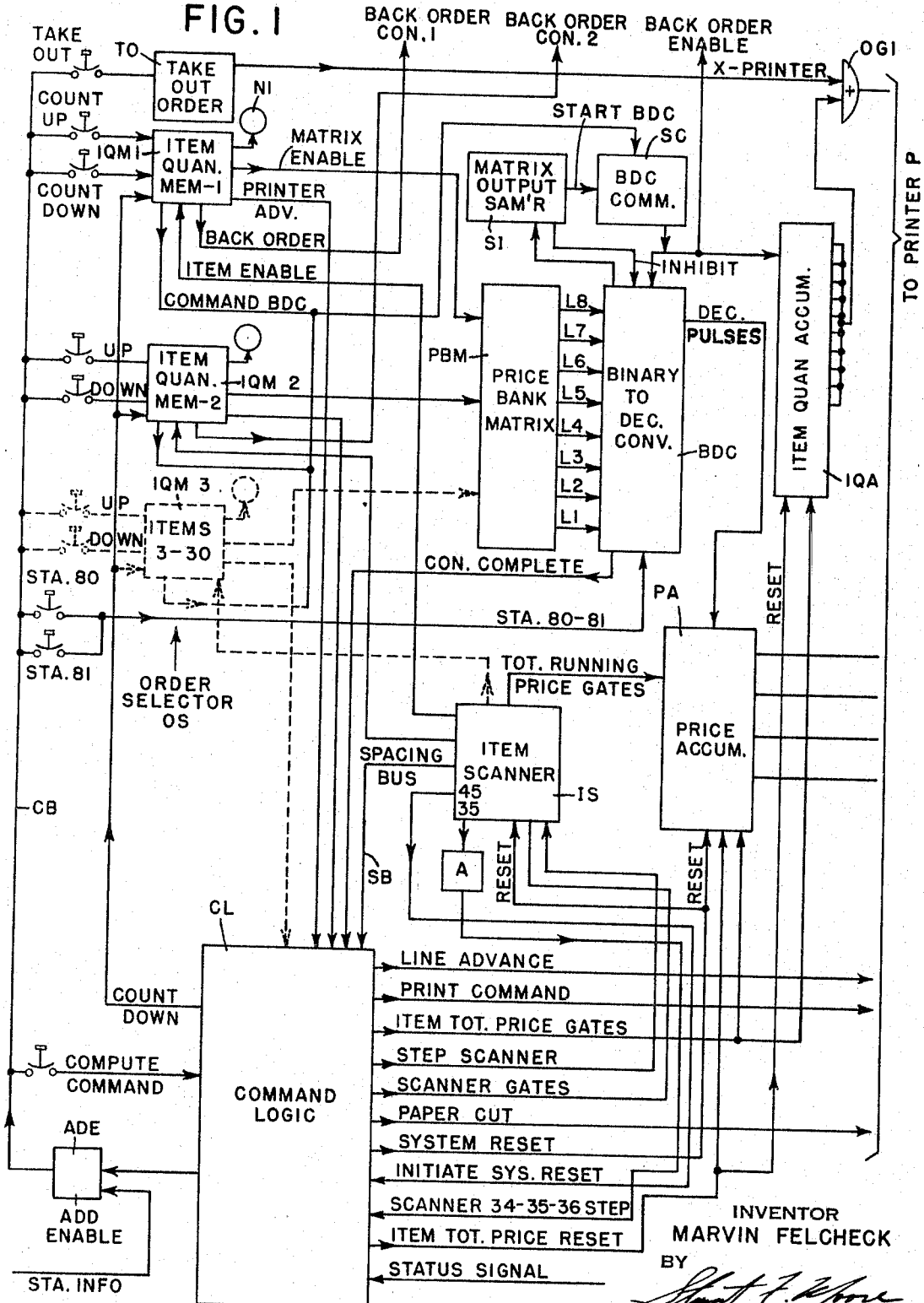
FIG. 1 shows in block diagrammatic form certain functional sections of the ordering, price computing and billing system of the aforementioned Alpert et al. application, and diagrammatically the connections between these sections and the printer included in the control arrangements at the present invention.
Figure 5A:
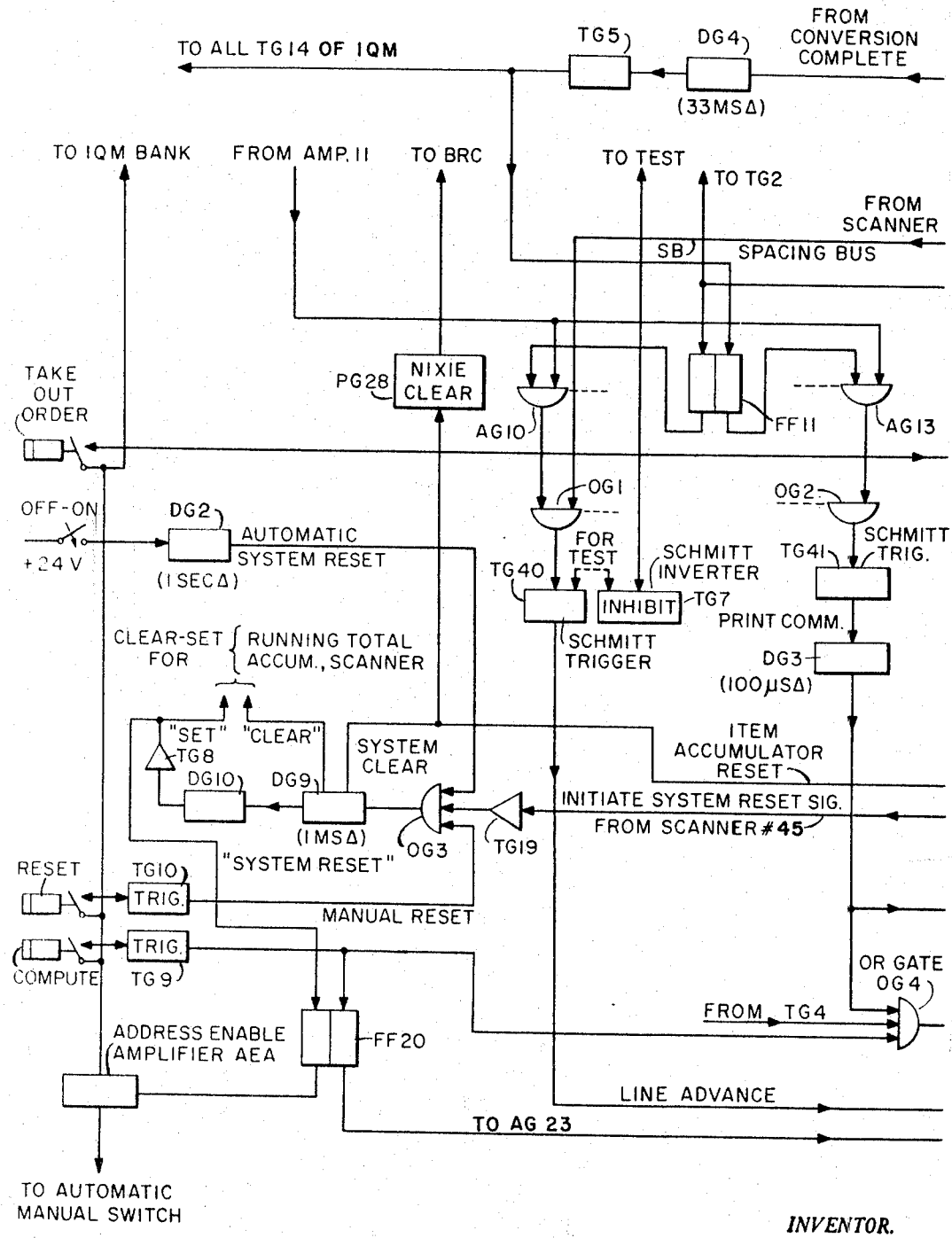
Figure 5B:
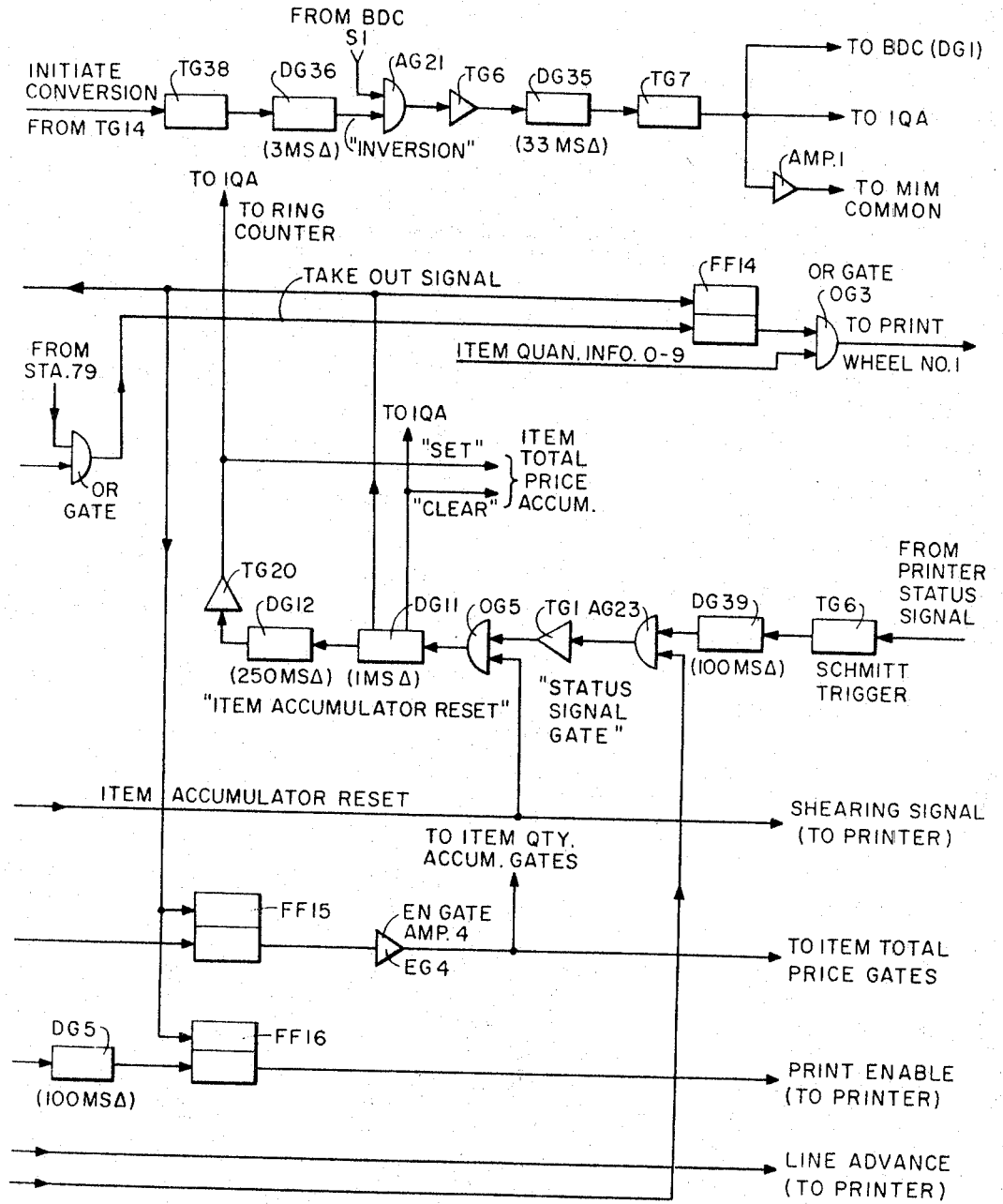
Figure 7:
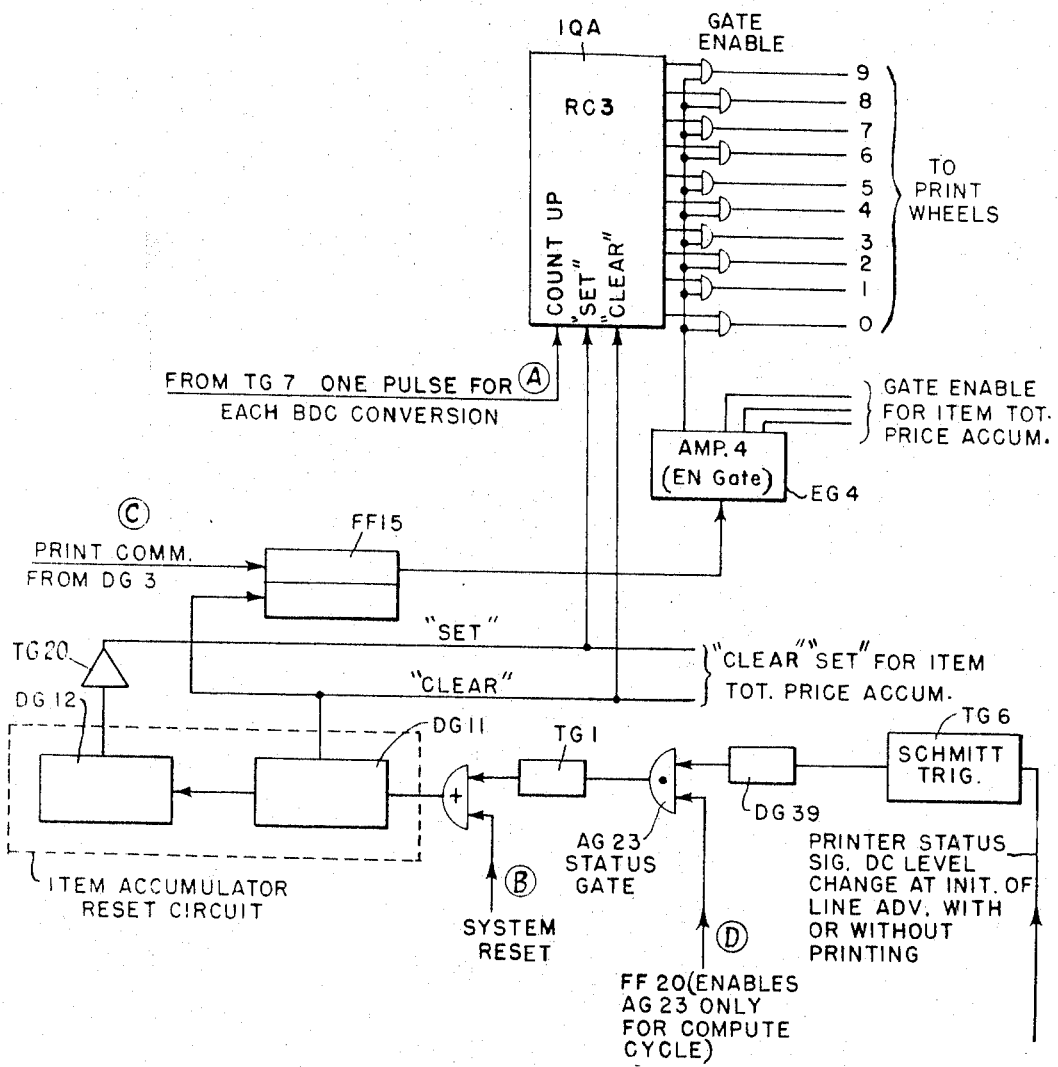
Figure 8:
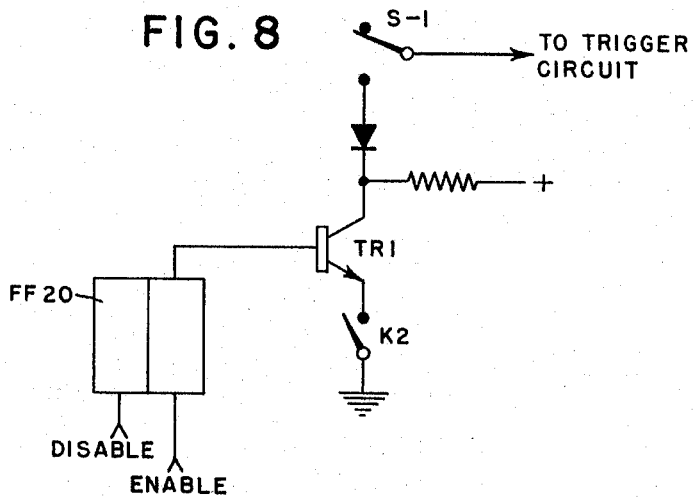
Figure 9:
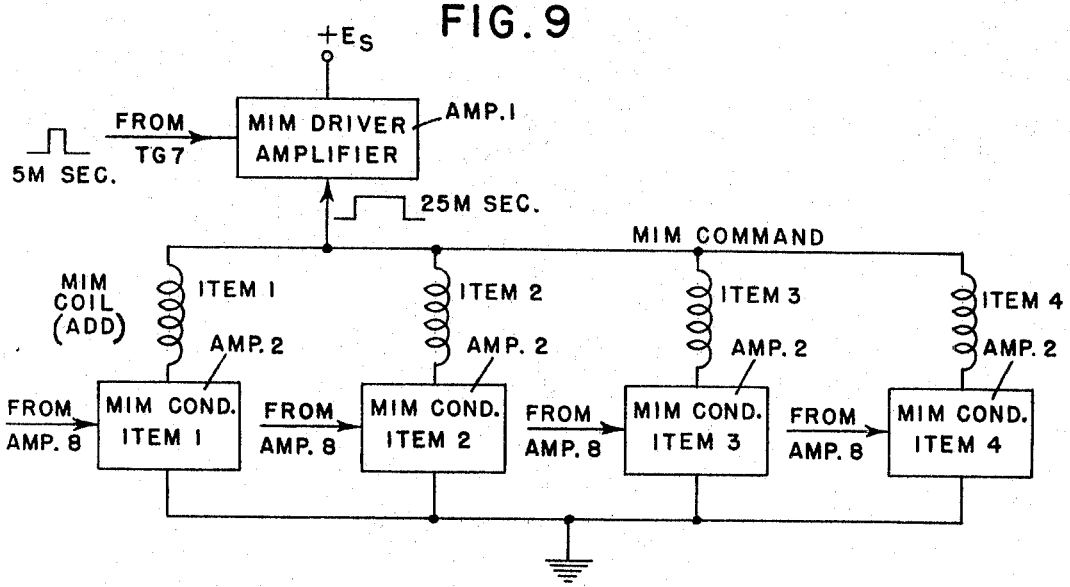

FIGS. 5A and 5B in combination show a block diagram of the apparatus in the command logic section of the system of FIG. 1, used in connection with the description of its control operations with respect to the other sections of that system;

FIG. 6 shows waveforms illustrating the timing sequence of the apparatus in the command logic (front end) section of FIGS. 5A and 5B to provide the desired functions in proper order;

FIG. 7 is a block schematic diagram of the ring counter item quantity accumulator of the system of FIG. 1, in combination with the associated control apparatus of the command logic section of that system, in accordance with the invention;

FIG. 8 shows schematically the arrangement used for disabling the front panel switches in the system of FIG. 1 in accordance with the invention; and FIG. 9 shows the block schematic diagram of the circuit for producing back-order signal information in the system of FIG. 1.

The all-electronic ordering, price computing and billing system disclosed in the aforementioned patent application of Alpert et al. may be subdivided into five functional sections: (1) ordering section; (2) price bank matrix; (3) binary to decimal converter; (4) command logic; and (5) accumulator section.

Referring to the block diagram of FIG. 1, the computer of the invention includes as main elements the order selector OS; the item scanner IS; the binary to decimal converter BDC; an accumulator section including the item quantity accumulator IQA and the price accumulator PA all represented by suitably labeled boxes; and an associated printer P.

The order selector OS includes thirty item quantity memory devices IQM, one for each of the thirty food items, 1–30 on the menu of the restaurant in which used. Associated with each of the memory devices IQM are order controls, such as push buttons, designated UP and DOWN, and a visual neon tube and other indicating device designated NI. Also in the ordering section is a menu or "compute command" control associated with the command logic section CL; and two other controls designated STA. 80 and STA. 82 connected to the binary to decimal converter. An amplifier enable switching device AEA controlled from the command logic CL is utilized to control the supply of station information, including customer orders, to the memory devices IQM through the associated order controls.

Also, the take-out order circuit to which associated take-out controls are connected through the OR gate OG1 to the printer P serves to provide means for causing the printer to print take-out information on the bill. The outputs of the item quantity accumulator IQA are connected through the same gate to the printer.

The price bank PBM and its use in fixing item price are disclosed and completely described in the aforementioned Alpert et al. application; the binary to decimal converter BDC and the associated matrix output sampler SI and selector circuit SC indicated in FIG. 1 by suitably labeled boxes, and their use are disclosed in the copending patent application of W. J. Mahoney, Ser. No. 219,214, filed Aug. 24, 1962, now Patent 3,197,762 which issued July 27, 1965; and the price accumulator PA and associated gating arrangements are disclosed in the copending W. J. Mahoney and N. N. Murthy patent application, Ser. No. 273,347, filed Apr. 16, 1963.

Figure 2:
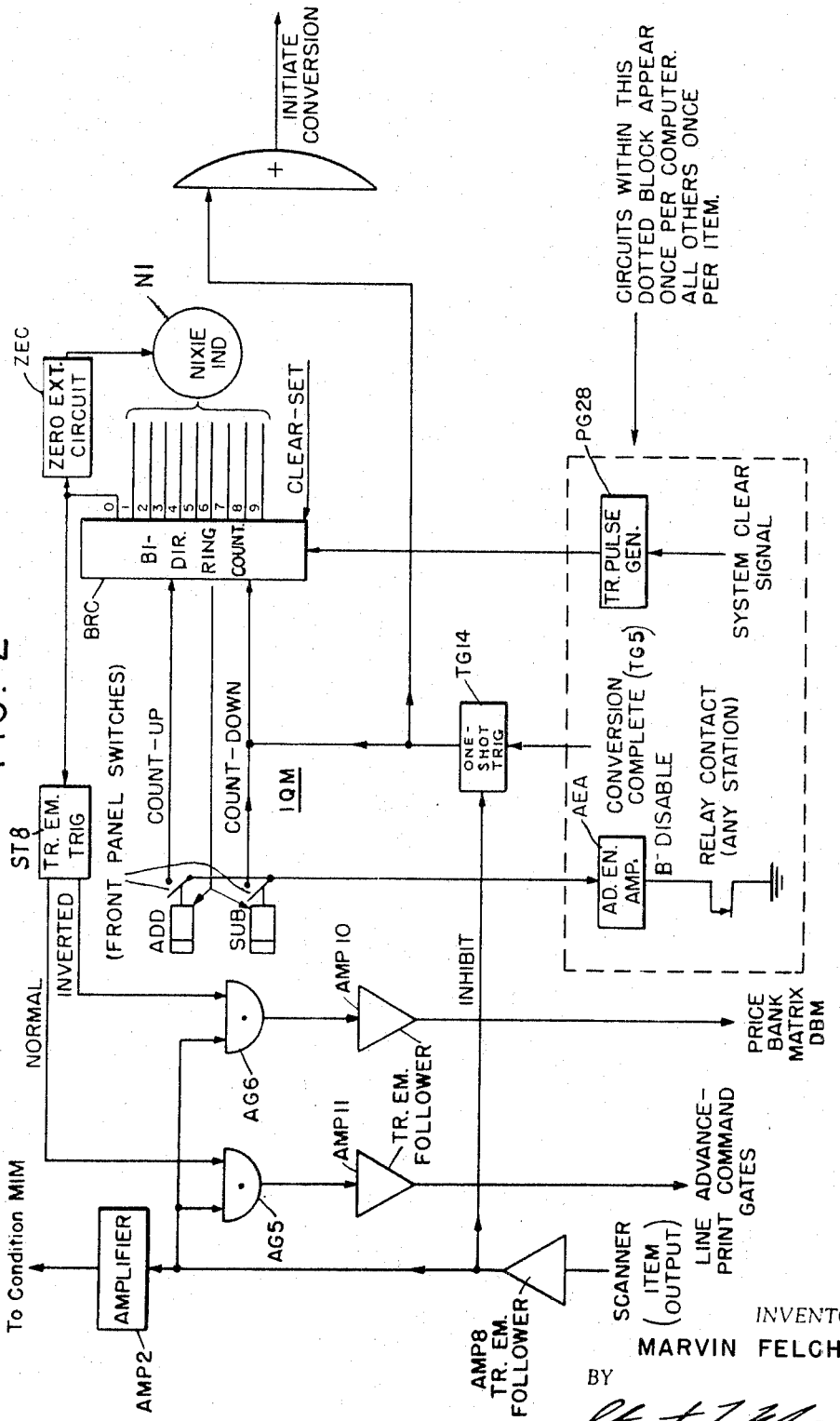
FIG. 2 is a block representation of one of the like item quantity memories in combination with the push button ordering keys in the order selector of the system of FIG. 1, and the associated control apparatus of the command logic section in accordance with the invention.
Figure 3:
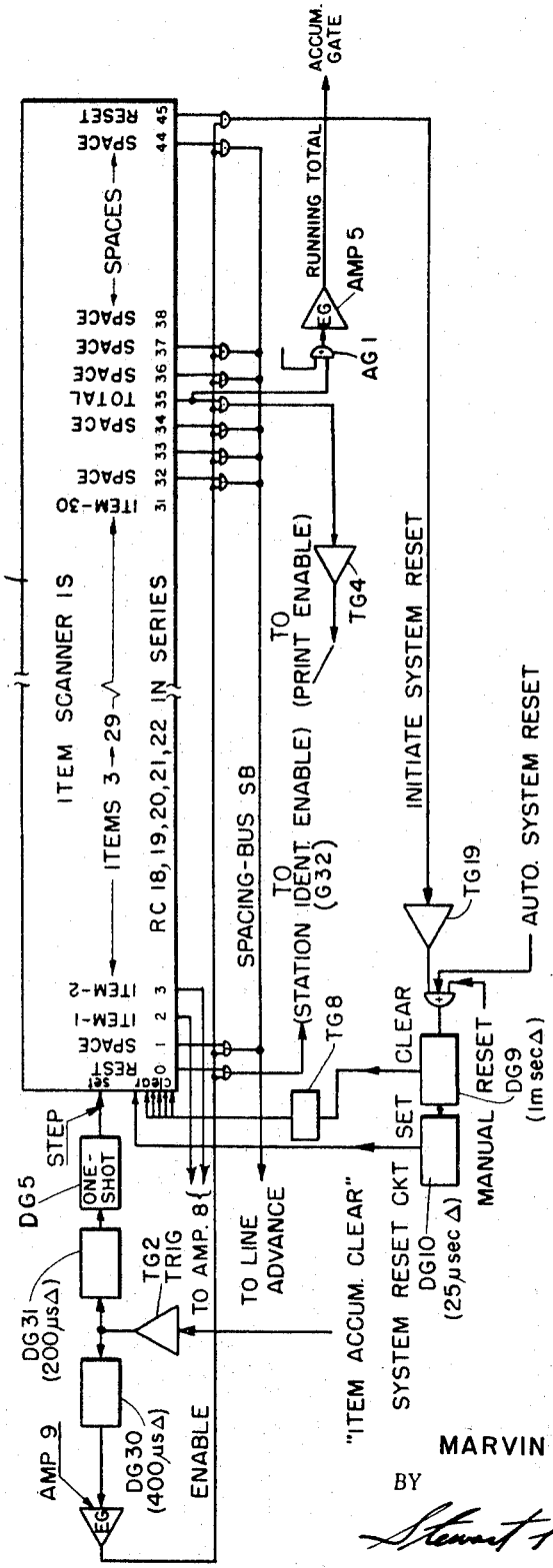
FIG. 3 is a block representation of the item scanner in the ordering section of the system shown in FIG. 1, and shows in block diagrammatic form the associated control apparatus of the command logic section in accordance with the invention.

The logic control apparatus in the command logic section CL is shown in detail in FIGS. 5A and 5B and the part thereof used in controlling the item quantity memories IQM, the item scanner IS and the item quantity accumulator IQA are repated in FIGS. 2, 3 and 7, respectively.

The printer P used with the system of FIG. 1 may be of any suitable electromagnetic type, for example, of the Shepard "Typer" type which combines electronic and electromagnetic principles for printing from information signals furnished by a data processing system. It is disclosed in Shepard U.S. Patents 2,987,210, issued Apr. 2, 1957, and 2,999,232, issued Aug. 22, 1961. As described in the specification of the Alpert et al. application, during the course of a print cycle, the printer furnished status signal back to the data processor (the computer) to indicate the status of the cycle at every instance. They are used at the data processor for either timing its information and command signals or as an interlock against supplying signals at improper times. At the completion of the printing cycle, a change in the status signal occurs and a signal is sent through the command logic apparatus CL to condition control apparatus therein to disable the output gates to the printer, in the manner which is completely described in connection with FIG. 5B. The reset circuit also "clears" and "sets" the counters of the item quantity accumulator IQA and price accumulator PA in the manner which is described in connection with FIG. 7, so that they are ready for the next computed item.

The connections and controls between the various components of the computer, as shown in FIG. 1, are indicated therein by suitably labeled lines. Briefly, the system shown in FIG. 1 operates as follows. Each of the item quantity memories IQM in which an order has been entered by the operator by operation of the associated order controls produces an output voltage representing the quantity of a different one of the items on the order. The item scanner IS comprising a separate group of ring counters, described in connection with FIG. 3, provides scanning voltages which are used for sampling in sequence the output voltages of all the item quantity memories IQM, and the voltage of each sampled item is passed into the price bank matrix PBM which will produce in binary form the total price of each item being sampled. The binary to decimal converter BDC changes the static binary output voltages of the price bank matrix PBM into their equivalent representation in decimal pulses. The decimal pulses in the output of the converter BDC and the output pulses of each of the item quantity memories IQM are fed respectively to the price accumulators PA and the item quantity accumulator IQA, which accumulates and stores this information therein. The output of the price accumulator PA and the item quantity accumulator IQA under control of apparatus in the command logic CL and the item scanner IS are applied through suitable gates (not shown) to the printer P which operates to print this information on a customer's bill. Apparatus in the command logic section CL and the item scanner operate under control of the operator to send command signals to the printer P ordering it to print the supplied information to advance a line, and to cut off the bill from a tape at the proper times.

The keys labeled STA. 80 and STA. 81 in the ordering section (FIG. 1) are connected to control apparatus in the output of the binary to decimal converter BDC, so that when either of these keys is operated by the operator the price computing functions of the converter are disabled while allowing normal operation of the latter for its other conversion purposes. As indicated by the lines labeled "back order" connected to the output of each of the item quantity memories IQM, back-order signals are produced therefrom and transmitted to the back-order condition terminals 1, 2, 3, 4, etc., for further use, as will be described in connection with FIGS. 5A, 5B and 9.

Other apparatus in the system of FIG. 1 and their operations will be described in connection with the later description of these sections in connection with FIGS. 2, 5A and 5B.

As shown in FIG. 2, each of the like item quantity memories IQM associated with each of the thirty different food items 1-30 of the ordering section has two order buttons designated the ADD order button and the SUB order button. Pressing the ADD button once will order one of that item, twice two of the items, and so on. The SUB button is used for subtracting part of the order, or the entire order, of that item. For example, should the customer have first ordered three of a particular item and then changed his mind and wanted one instead, the SUB button would be pressed two times to subtract two of that particular item ordered. This would leave the desired quantity of one of the items to be ordered.

Various quantities (one to nine) of any of the thirty items may be ordered. The order information up to this time, has not been entered into the computer. Any changes in the items ordered or the item quantity requested by the customer, must be made at this stage of the ordering sequence. When the customer is satisfied that the order he is placing is the correct and final version, with no further changes to be made, the operator presses the "order menu" or compute command button (FIG. 1) which issues and causes a print command signal to be transmitted to the associated printer P. Once this button is pressed, all item order and order subtract circuits are disabled and no further changes can be made.

If an order is a take-out order, the operator will press the "take-out" order button (FIG. 1) to issue a command to the printer to indicate by marking an X on the final printed bill that the food is to be taken out of the restaurant and, therefore, must be properly wrapped. Otherwise, the food will be brought out on a tray for eating on the premises. As shown in FIG. 2, a NIXIE tube or other commercial visual output indicating device NI and an associated zero extinction circuit ZEC for extinguishing the tube when no orders are in the item quantity memories IQM, are slaved to each of the item quantity memories.

As shown in FIG. 2, each item quantity memory IQM includes a bidirectional ring counter BRC, which is preferably of the type disclosed in the application of M. Felcheck, Ser. No. 197,662, filed May 25, 1962, now Patent 3,248,562 which issued Apr. 26, 1966, which is electronically equivalent to a bidirectional stepping relay. This ring counter has 10 positions each activated by its own trigger circuit. A depression of the ADD order button will cause the trigger to step or count up in the ring counter one position. A depression of the subtract SUB order button will cause the trigger to step or count down in the ring counter one position. Of the ten output positions of the ring counter, only one position will have a voltage present at any time. This voltage is used in two ways. First, it is used to energize the appropriate numeral in the visual readout NI. Secondly, the presence or absence of a D.C. level signal at the zero stage of the counter, as other stages are energized, is used to open or close electronic gating circuits (not shown) in the output. If, for example, the item 1 order button is depressed three times, the ring counter will have a voltage present in its third output position. This voltage will remain at that position providing a memory, and tells how many units of a particular item have been ordered. In addition, through logical circuitry to be described, it can tell the price for any quantity of that particular item. The output voltage of each item quantity memory IQM is connected through suitable gating circuits (not shown) to the price bank matrix PBM (FIG. 1). This D.C. voltage output is present when any other stage except zero is enabled, and turns off when the ring counter BRC rests on zero.

The control apparatus in the command logic CL associated with the item scanner shown in FIG. 2, which may be referred to as the front end logic block, operates in the system of FIG. 1 to furnish the necessary signals for time-sharing the binary to decimal converter, the menu item memory (MIM) conditioner or driver (FIG. 9) and the command logic so that the prices of the ordered items are calculated, the menu item memory stepped and, at the proper time, the command logic issues and transmits signals to cause the printer to print or advance a line. The counters of the front end logic block also store information as to the item quantity and are adapted to be counted down by the action of the associated binary to decimal counting chain (FIG. 5A). It further supplies an output signal to the binary to decimal converter at the completion of the count down cycle. It is also unique in that it can be sampled by the scanner IS. Large numbers of the blocks can be used with essentially no interaction, so that the menu can be increased simply by inserting additional logic blocks. The apparatus in the command logic for producing these results and the method of operation will be described later in connection with the description of the command logic in FIGS. 5A and 5B or the complete description of operation for one billing cycle.

The item scanner IS, shown in FIG. 3, controls the sequence of activities once the compute command is given. As the scanner is stepped to position after position, different computer functions are performed. In this sense, the computer is preprogrammed by the scanner connections.

Physically, the scanner is made up of five standard, open-ended, ten-stage ring counters RC, 18 to 22, connected in series. Since each ring counter has its own signal transfer mechanism, these mechanisms are all connected in parallel, so that for each transfer signal all the ring counters act to step the signal ahead provided there is a signal in that ring counter. The "clear" circuits of these counters are also connected in parallel so that all ring counters are "cleared" simultaneously. The "set" circuit of the first ring counter RC18 is connected to the item stepping input from one-shot generation DG5; all others are open, so that after the rings are simultaneously cleared, the first stage of the ring counter RC18 is set. Now, when a shift pulse is applied to an item stepping input from DG5, this signal will travel along until it gets to the tenth stage, at which point it transfers to the next ring counter. The mechanism of transfer is to connect the output of the last stage of the first ring counter to the first stage of the second ring counter. The ring counters are left open-ended, so that once the signal has reached the last stage of a ring counter it will carry on to the next, leaving the first ring without a signal. In this manner, the signal is pulsed along and transferred from ring to ring.

The stepping of the scanner IS is accomplished by the triggering of trigger TG2 in the command logic CL by the item accumulator clear signal, generated by the clear generator DG11 of the item quantity reset circuit in response to the status signal from the printer P. TG2 triggers both delay generators DG30 (400 $\mu$sec. delay) and DG31 (200 $\mu$sec. delay). DG30 and DG31 go into the quasi-stable state. DG30 acts on enable gate AMP 9 such that the ring counter gate loading is removed for the period that DG30 is in its quasi-stable state. DG31 acts for a total time of 200 $\mu$sec. at the end of which it triggers the Shockley one-shot trigger TG5. TG5 supplies a shift pulse to all the scanner ring counter stepping inputs in parallel. The time to step the scanner is 15 to 20 $\mu$secs. The scanner has now moved to its new position without any gate loading. The gates will be reapplied after DG30 completes its quasi-stable period (time delay of 400 $\mu$sec.). In this manner, the scanner IS is stepped wtihout gate loading. The scanner step timing sequence is shown by the curves of FIG. 4.

FIGS. 5A and 5B in combination show a block diagram of the control apparatus in the command logic section CL of FIG. 1 for controlling the many functions performed by the computer thereof.

The command logic apparatus includes a number of flip-flops, AND and OR gates, Schmitt trigger circuits, time delay generators (monostable multivibrators) and one-shot multivibrators, using solid state elements, well known in the prior art, which are illustrated by suitably labeled blocks or other well-known representations. The invention resides in the particular functions or operations. Some of these operations are described below in connection with a functional description on ordering and command logic as shown in FIGS. 5A and 5B, and the operations thereof to perform these and other functions are more completely described later in the complete description of operation of the system in connection with a sample billing operation.

FUNCTIONAL DESCRIPTION OF ORDERING AND COMMAND LOGIC

(FIGS. 5A and 5B)

*System reset.*—The operation of system reset circuit delay generators DG9 and DG10 places the entire computer into a predetermined state. This is necessary so that given the proper inputs, the machine will perform its prescribed functions.

There are three ways in which the computer can be put into a system reset mode:

(1) System turn-on;
(2) Manual push button;
(3) At the completion of its normal operating signal.

When the system is turned on, it will automatically go under the system reset mode by the action of DG2 of FIG. 5A. DG2 is a monostable time delay multivibrator which supplies a pulse to the "system reset" DG9 and DG10 circuit via OR gate OG3 one second after the machine turns on. The "manual" operation of initiating system reset is through trigger TG10. Trigger TG10 will supply a pulse to the system reset DG9 and DG10 circuit each time the system "reset" button is actuated. At the completion of the computer's normal operating cycle, a pulse is delivered from position 45 of item scanner IS via trigger TG19 to the system reset DG9 and DG10 circuit.

Once triggered, the system reset circuit will deliver three signals (1) clear; (2) system clear; (3) set.

The item quantity (IQA) and item total price (ITP) accumulators are reset to 0 by the item "clear" and "set" signals. The "item accumulator clear" signal triggers flip-flop FF11, FF14, FF15 and FF16 and trigger TG2. The resulting state of FF11 acts to close AND gate AG13 and open the AND gate AG10. The triggering of TG2 starts a complex scanner cycle which is discussed later in connection with the scanner description and operation. The "take out order" flip-flop FF14 is set to the state whereby the signal and its output is ZERO which calls for no printing operation at the wheel No. 1 of the printer. FF15 is set to a state whereby it acts on an enable gate EG4 to disable the AND gates at the outputs of the item ring counter RC1 of item quantity accumulator IQA, and the item total price accumulators ITP. Flip-flop FF16, the print enabling device, is set to a state whereby its output control signal does not call for print enable.

The item accumulator reset circuit goes through this sequence of operations each time system reset is called for or a return signal from the printer is passed through status gate AG23.

When the scanner IS has been set to its 0 or rest position by the system reset operation, all outputs except the 0 stage are at their off potentials. Schmitt trigger inverter TG32, which is driven by the 0 stage, acts to enable the station identification matrix. The total running price accumulator TRP has its output gate OG1 disabled through the action of scanner levels on the amplifier AMP 5 associated with the output of the scanner IS. All items are disabled by outputs through positions 2 through 31 of the scanner. Further, all scanner outputs to the spacing bus SB are disabled by the scanner off levels at positions 1, 32, 33, 34, 36 through 44 on the scanner. The computer has now been set to a predetermined state whereby it is read for new information and will quickly act upon it when the "compute command" is given by the operator.

The command logic supplies information to and receives information from the printer P; in particular, supplying the print enable, line advance and shearing commands at the proper times in relation to other computer operations, i.e., the print command is delayed long enough to allow the print wheel information to stabilize.

*Line advance.*—The printer is caused to advance a line without printing whenever Schmitt trigger TG40 of the command logic CL has its output line at low potential. TG40 is controlled via OR gate OG1 either by the outputs of the AG10 gates or the spacing bus SB (FIG. 3). The spacing bus SB is the common output of the AND gate activities of those scanner stages which are programmed to give a line advance.

*Print enable.*—The printer is caused to print the information present on its print wheel lines whenever flip-flop FF16 of the command logic CL (FIG. 5B) causes a negative D.C. level to be sent via the print enable line. The flip-flop FF16 of the command logic CL is reset by the "item accumulator clear" signal and caused to give a print enable signal by operation of the delay generator DG5. DG5 is a 100 $\mu$sec. delay generator which can be triggered by either trigger TG9, delay generator DG3 or the transistor amplifier trigger TG4 (FIG. 3) acting through OR gate OG4. Trigger TG9 is a Shockley one-shot switch. DG3 is a delay generator (100 $\mu$sec. delay) which is caused to be triggered by Schmitt trigger TG41. The trigger TG41 is controlled by the OR gate OG2 from AD gate AG13. TG4 can be triggered by the scanner IS directly and is attached to those positions on the scanner where print command is desired.

The timing sequence of the comamnd (front end) logic CL is given by the waveforms of FIG. 6 (for a quantity of three).

*Time-shared item quantity accumulator.*—The function of the item quantity accumulator IQA circuit, shown in FIG. 7, is to present the quantity of each item ordered to the printer. It presents this information in synchronism with the item total price accumulators PA of the accumulator section, which present the total price for the quantity ordered.

For example, if a quantity of 4 of a 25¢ item is ordered, then the item quantity accumulator IQA activates line 4 of column 1 of the printer bill, and the item total price accumulators of the accumulator section AS activate lines 0, 1, 0, 0, in columns 2, 3, 4 and 5, respectively.

In the standby condition (computer waiting for information), the ring counter RC1 of IQA has been "cleared" and "set" to zero by the system reset signal (B) acting through the item accumulator reset circuit DG11–DG12, TG20. When the compute command is given, flip-flop FF20 (D), which was previously in the state to disable AND gate AG23 and consequently lock out any return signals from the printer via DG39–TG6, conditions gate AG23 to be enabled upon the return of a status signal from the printer.

When the first ordered item is being acted upon, a pulse will appear at (A) each time the binary to decimal converter BDC is initiated. RC1 will count up the total pulses appearing at (A) and store this information. (Each time the BDC converts the item total price, accumulators in PA also store the total count or price.) At the end of the computation for the first item, a pulse will appear at (C) from DG3 (FIG. 5A) which calls for a print command. Flip-flop FF15 is now set to a state whereby AMP4 enables the output of RC1. The outputs of the item total price accumulators PA in the accumulator section are simultaneously enabled. The printer will print the item quantity and item total price information. At the completion of the printing cycle, a change in the status signal occurs and a signal is sent through TG6–DG39–AG23–TG1 which activates the item accumulator reset circuit (DG11–DG12) which resets flip-flop FF15. This acts on AMP4 to disable the total price accumulator output gates to the printer. The reset circuit also "clears" and "sets" RC1 so that it is ready for the next computation.

The disabling of the front panel switches associated with the ADD and SUB ordering keys of the item quantity memory IQM is accomplished simply and economically by a portion of the front end logic block of the command logic (FIG. 2). The purpose and operation of this block portion are described in the following section.

*Enable interlock (FIG. 8).*—The computer is provided with an interlock so that no information can be entered therein and no bill can be processed unless the operator is in contact with a subscriber's station. All front panel switches (shown in FIGS. 1 and 2), except reset switches, are disabled unless a station location button has been depressed and a controlling relay locked in. In FIG. 8 is shown a typical switch attached to the interlock circuit.

Referring to FIG. 8, the transistor TR1 and the associated switch K2 have to be in the conducting or transmitting state for switch S–1 to provide the associated trigger circuit with a ground signal. Transistor TR1 is part of the address enable amplifier AEA (shown in FIG. 1 and in FIG. 2), which is a solid state switch controlled by the flip-flop device FF20. Switch K2 is a memory open contact which is closed whenever a station location relay is latched in.

After information is entered into the computer and a "compute command" is given, no information can be entered until the bill is completed. This is accomplished through the action of TR1, which is caused to "open" by FF20 during the computation cycle. FF20 is "set" by the compute command. At all other times, TR1 is "closed," since FF20 is reset at the end of the computation, and K2 determines the enabling.

FIG. 9 discloses a circuit arrangement for producing back-order signal information from the system of the invention. As shown in this figure, it comprises a main menu item memory (MIM) driver amplifier time-shared with a parallel arrangement of the MIM ADD coils of the item quantity memories 1 to 30 each connected in series with an individual MIM conditioner AMP2 for a different one of the commodity items 1 to 30 and controlled from the transistor follower AMP8 of the item quantity memory IQM (FIG. 2). The MIM driver amplifier AMP1 which is controlled by a 5 mesec. pulse supplied from a Shockley trigger TG7 (FIG. 5B) of the command logic supplies a 25 msec. pulse to the MIM ADD coils of the parallel circuit. This circuit arrangement operates as an electromechanical bidirectional counter. The MIM driver amplifier AMP1 and the MIM conditioner AMP2 are disclosed in the co-pending application of M. Felcheck, Ser. No. 181,336, filed Mar. 21, 1962, now Patent 3,231,786 which issued Jan. 25, 1966.

The component elements and operation of the command logic CL for performing the many functions of the computer including the furnishing of the necessary signals for time sharing the binary to decimal converter, the menu item memory conditioner or driver and the command logic, which drives the printer; the sampling of the item quantity memories by a scanner type operation; the scanner drive and stepping and gate sampling techniques; and the counting chain between the binary to decimal converter and the front end logic block for initiating and utilizing the conversion complete signal, are described in more detail in the following complete description of system operation on the billing cycle.

SYSTEM OPERATION

*(Refer to the system block diagram of FIG. 1 and the ordering and command diagrams, FIGS. 5A and 5B)*

The system operation for one billing operation is as follows:

(1) The operator inserts quantity information individually into the item quantity memory bank IQM (Items 1 to 30). The accumulators in this bank are reversible so that the corrections may be entered (M. Felcheck Patent 3,248,562). As the count progresses, each item total quantity is displayed visibly on a NIXIE indicator NI. In case the order is to replace spilled or damaged merchandise, the operator pushes the station 81 selector button. This permits printing of the new bill with item quantity identification, but without prices. A similar operation is performed in the case of Employee's Free Lunch; here selector button 80 is actuated.

(2) When order insertion is completed, the operator then activates the compute command button.

(3) *Compute command.*—(A) conditions the STATUS gate AG23 via FF20. This action now allows the STATUS signals from the printer through Schmitt trigger TG6 and the 100 μs. delay generator DG39 to be operative upon the item scanner. Prior to this time the scanner has been locked against printer signals occuring after the end of a previous cycle, when the system was reset. When FF20 is enabled, the address enable amplifier AEA is disabled, removing power from all operator's push buttons. The operator is no longer capable of entering further information into the machine while computation is taking place. A further switching arrangement is in series with the address enable amplifier AEA and the system power supply. There is one set of contacts on all customers communication and identification relays, in parallel. At least one of these relays must be closed, signifying that the operator is in contact with a customer before any of the operator's push buttons and the compute command can be activated. External circuitry disables the relay after the identification has been printed. (B) A first PRINT COMMAND is given to the printer (DG5–FF16) which prints the symbol X by the column 1 wheel in the first space on the bill if the take-out button has been pushed or phone station 79 used. (This signifies a take-out order.) The station identification information is printed in columns 3, 4 and 5 of the bill.

(4) After the printing of the take-out order symbol (X) and the station identification information, the printer returns a STATUS signal into the status signal gate AG23 through TG6 and DG39, initiating item quantity reset (DG11–DG12). Every STATUS signal from the printer initiates a subsequent computer event through this item quantity reset circuit. The following events take place simultaneously for each return STATUS signal:

(i) The scanner IS is stepped one position;
(ii) The item quantity accumulator IQA (ring counter RC1) is reset to 0;
(iii) The item total price accumulator bank ITP in PA is reset to 0;
(iv) The following flip-flops are reset:
   (a) FF11—the line advance gate (AG10) is enabled.
   (b) FF16—the print enable device is reset removing the D.C. control (print enable) signal until another is called for.
   (c) FF15—through enable gate AMP4 disables the output gates of the item quantity and item total price accumulators.
   (d) FF14—the take-out order device is reset removing the D.C. control signal at its output.

(5) The scanner IS has now been moved from the zero position to Step 1. In leaving the zero position the station identification information has been removed. This is accomplished through Schmitt trigger inverter (disable) TG32 whose output is in series with the station identification information (FIG. 3). The input of TG32 is taken from the "zero" scanner stage so that the output is at ground when the zero stage is on and is open for all other positions of the scanner IS. The scanner IS "one" position is tied to the spacing bus SB, which functions to permit one unprinted space on the bill. The spacing bus SB is clamped, or gated, by DG30 and the enable gate AMP9; therefore, 200 μsec. (the difference between the delays of DG31 and DG30) after the scanner moves to Step 1, the spacing bus SB is activated. Schmitt trigger (restorer) TG40 is energized through the OR gate OG1 and a LINE ADVANCE signal is given to the printer, moving the bill one space.

(6) The STATUS signal is returned from the printer after the bill has been moved, and the scanner is stepped to stage 2 which is the Item Number 1 position. (Although the usual clear signals were sent to FF11, item quantity accumulator IQA and item total price accumulator ITP of the accumulator section PA, these had not been activated when the paper spacing alone was commanded; therefore, no action results in these circuits.)

The description of the computer action on scanner position 2 (Item No. 1) is typical of all positions from 2 to 31 (Items No. 1 to 30). Each stage is connected (without internal gating) to its appropriate item AND gate AG5 (shown in FIG. 2) through an emitter-follower AMP8, which is used to reduce the loading of the scanner stage. A second output is taken from the followers AMP8 and AMP2 to the MIM conditioning circuit, preparing for insertion of the item into the back ordering system (M. Felcheck Patent 3,231,786). The computer action may take either of two forms at this point, depending upon whether (A) no quantities have been entered in the item quantity memory IQM, in which case the printer only moves the bill one line without printing, or (B) quantities are in the memory, computation must take place and the bill will receive printable information before shifting.

*Condition A.*—With no item in the item quantity memory for the given scanner stage.

(7A) Item quantity memory Schmitt trigger (D.C. restorer) TG8 will send a "normal" signal to the AG5 gate, the 0 NIXIE indicator stage NI being in conduction (FIG. 2). The other AG5 gate input, being from follower AMP8 of the appropriate scanner stage, will also be enabled. Therefore, a signal will pass through the LINE ADVANCE gating system to Schmitt trigger (restorer) TG40, then to the printer, moving the bill one space without printing (FIGS. 5A and 5B).

(8A) The STATUS signal is returned from the printer, stepping the scanner to the next stage.

*Condition B (see FIG. 1).*—Quantities are in the item quantity memory IQM. Computation, back-ordering and bill printing must take place. The computation will be handled by causing the binary to decimal converter (decoder) BDC to emit the number of decimal bits corresponding to the price for each step of the item quantity memory IQM as it counts itself progressively downward to zero items. In other words, if there is a quantity of five held in the item quantity memory and the individual price of the item is twenty-five cents, then the BDC (decoder) will emit five bursts of twenty-five pulses which will be entered into both the item total price ITP and total running price TRP accumulators of the accumulator section PA. Between each burst of pulses the ring counter of the item quantity memory IQM will be stepped backwards one step, the ring counter of the item quantity accumulator IQA (which provides printing information for a number of items) and the mechanical counters of the menu item memories MIM will be advanced one step.

The logic sequence for one operation is as follows:

(7B) Items are in the memory so the Schmitt trigger TB8 is in its "inversion" state—gate AG6 is enabled (the second input from the scanner is also enabled). The emitter-follower AMP10 output from this gate enables the appropriate price line in the decimal to binary diode matrix DBM. The existence of an enabling level on the output lines L1 to L8 of that matrix is the means by which the following binary to decimal converter or decoder BDC is caused to initiate the first round of computation. This is accomplished by the BDC Schmitt inverter SI which comprises the diode matrix sampler DMS of FIG. 1. The operation of this inverter on the output gate 2 of the binary to decimal converter is discussed in the aforementioned Mahoney application, but works in the following manner:

If no signals are on any matrix output line, the Schmitt inverter SI is inhibited, thereby closing AND gate AG21. The presence of a price signal on the matrix will enable SI. The other input to gate AG21 is the *inversion* output of the one-shot 3 msec. delay generator DG36, and this enable signal is available at all times except for a 3 msec. interval after the binary to decimal converter BDC finishes its computation. The reason for the existence of DG36 will be discussed in its proper location.

(8B) The enable of AG21 through trigger TG6 triggers a 33 msec. delay generator DG35 and at the end of this interval a pulse is passed from trigger TG7 to the DG1 of the binary to decimal converter BDC to start its conversion cycle.

The same pulse steps up the ring counter in item quantity accumulator IQA and also steps up the mechanical ring counters in each menu item memory MIM. The menu item memory can only step at the rate of 15 steps per second, and in order to accommodate this the item quantity memory count rate must be limited to 65 msec. This is the reason for the existence of the two monostable multivibrator delay generators DG4 (33 msec. delay) and DG35 (33 msec. delay). As a one-shot multivibrator minimum recovery time is 10 percent of the delay interval, a single 65 msec. mutivibrator could not be successfully commanded to operate for 6 msec. after each activation. The actual demand time for the computer could be as short as 4 msec. (a 5c. item—5 pulses at 200 μsec., plus the 3 msec. delay of DG36). In order to have the multivibrator circuit available for readdressing in less than the recovery interval, it is standard practice to split the time delay between two generators in cascade, each being fully recovered before the tandem delay period is ended.

(9B) The binary to decimal conversion method used in the computer is fully explained in the copending application of W. J. Mahoney, Ser. No. 219,214, filed Aug. 24, 1962, now Patent 3,267,436 which issued Aug. 8, 1966, and will not be repeated here. At the end of one burst of decimal pulses, the equivalent of the price of one single item entered in the item quantity memory, a conversion completed signal is sent out from the flip-flop FF1 in the converter. This triggers the delay generator DG4— Shockley one-shot trigger TG5—which in turn, after 33 msec., tries to fire the Shockley one-shot trigger TG14 in all the item quantity memory IQM circuits 1 through 30. However, all TG14 circuits except the one presently under control of the given scanner stage are inhibited from firing by the follower clamp (semiconductor multivibrator as disclosed in the application of W. J. Mahoney, Ser. No. 181,336, filed Mar. 21, 1962), now Patent 3,268,737 which issued Aug. 23, 1966, piloted from the non-energized scanner steps.

The TG14 which is active, fires to step backward the bi-directional ring counter used in the item quantity memory circuit by one count. Assuming that a quantity greater than *one* item was in the ring counter, the *inversion* output of Schmitt trigger TG8 will remain, and the associated diode line of the price bank matrix PBM is still energized.

The firing of the trigger TG14 also sends a signal back to the binary to decimal converter BDC through the chain TG38, DG36, AG21, DG35, TG7 to command the subsequent round of conversion. A new train of decimal pulses is thereby sent to the price accumulators.

Under this step 9B, at the completion of the *first* conversion sequence, the pulse that returns from the converter through the 33 msec. delay generator DG4 and the trigger TG5 also sets the flip-flop FF11 to its PRINT COMMAND position. This conditions the gating network AG13 and OR gate OG2 into Schmitt trigger (restorer) TG41 and delay generator DG3 so that printing of the item total price will take plac ewhen the item quantity memory signifies the end of its final multiplication sequence by stepping to the 0 position.

The sequence of events under 9B is repeatedly undertaken as long as items remain in the bi-directional ring counter BRC of IQM.

(10B) When the final item in the given memory stage has been converted to decimal pulses and entered into the price bank accumulators, the bi-directional counter BRC of the item quantity memory IQM which had been on stage 1, is stepped backward ince more by the signal passed back from the binary to decimal converter BDC through DG4, TG5 and TG14.

As the bi-directional counter steps to its 0 stage, Schmitt trigger TG8 is enabled, removing the *inversion* signal and energizing the *normal* output. This enables gate AG5 (whose second input is already conditioned by the scanner stage through AMP8) and a signal is sent through the follower AMP11 to the PRINT COMMAND gating network AG13 (FF11 is still enabling the second input of this gate). Schmitt trigger TG41 and delay generator DG3 act upon this signal to energize flip-flop FF15, the item total price and item quantity accumulator gating control. The signal from DG3 also, through OR gate OG4, triggers the 100 $\mu$sec. delay generator DG5, and after this interval, which allows the item total price and item quantity gates to stabilize, the PRINT COMMAND signal is passed through flip-flop FF16 to the printer. It is seen that both gating and printing signals are controlled by flip-flops. This allows these two control signals to be continually presented to the printer until the printer has completed its action and returns the STATUS signal. The STATUS signal, acting upon the item accumulator reset system (DG11–DG12) resets both the flip-flop FF15 and FF16, removing the two control levels, and resets the ring counters of the item total price accumulator ITP and the item quantity accumulator IQA back to 0.

The amplifier AMP4, driven by flip-flop FF15 is the gating amplifier referred to in the discussion of the price accumulators and item quantity accumulator.

When printing of quantity and price information is completed, and before the STATUS signal is returned, the printer automatically shifts the bill by one space, thereby being in register for the next PRINT or ADVANCE computer command. Return of the STATUS signal does not cause a new LINE ADVANCE even though DG30 is triggered as the scanner is not resting on a stage which is connected to the spacing bus SB.

Let us return now to the beginning of the 10B sequence, at the point where the bi-directiinal counter BRC in the item quantity memory IQM had been stepped to 0 by a signal from the binary to decimal converter BDC. It was shown that, when that counter reached 0, the signal level was removed from the price bank matrix DBM. The removal of the matrix energization causes the sampler Schmitt inverter SI and the BDC converter to become disabled, shutting the AND gate AG21. Thus, no further triggering can pass to the generator DG35 so as to initiate additional computation by the binary to decimal converter BDC.

It will now be shown that such a trigger would pass through if this gating arrangement was not employed. When the last signal from the converter BDC stepped the bi-directional counter BRC of the item quantity memory IQM back from 1 to 0 by activating trigger TG14, the TG14 output also came back to the converter input line, as is usual for all stepping operations. In the absence of AG21, locking up against this signal, the convert command would have passed. The reason for the use of the 3 msec. delay generator DG36 may now be explained. This delay ensures that the diode matrix gates and sampler SI have suffcient time to stabilize at the disable condition before the compute command signal originating in the one-shot trigger arrives at the gate AG21. The Schmitt trigger TG38 which triggers the DG36 generator is a D.C. level-sensing circuit to clean up the deteriorated triggering pulse which is the result of thirty TG14 units tied together in the OR gating configuration. The computer has now completed the action required by the first item quantity memory IQM. It was seen that two modes of operation were possible:

*Condition A.*—Steps 7A and 8A, with no quantities entered for the item—no computation, but a LINE ADVANCE signal only was given to allow bill spacing;

*Condition B.*—Steps 7B, 8B, 9B, 10B, found a quantity entered in the item memory and proceeded to multiply by a series of addition steps—a burst of decimal pulses for each digit in the item memory. The item quantity was stepped up to allow printing of the quantity, and the back-ordering equipment was also informed of the quantity.

The computer is now ready to act upon the second item.

(11) When the printer completed its action on the quantity and price information of Item 1, it sent back its STATUS signal to the item quantity reset circuit. The clear generator of this circuit resets FF11 and, via TG2, DG31–Shockley one-shot trigger TG5, moved the scanner IS to Step 3, which is connected to Item 2.

(12) The scanner finally reaches the last stage connected to an item memory (Stage 31) by the described sequence of events and then is stepped to Stage 32, a spacing step to permit an unprinted line following the items. As the stage is connected to the spacing bus SB, at the end of the 400 $\mu$sec. delay of DG30, a signal is passed to the LINE ADVANCE trigger TG40 and the printer is caused to move one space.

(13) In the computer models without tax provision both Stages 33 and 34 are tied to the spacing bus, which initiates a LINE ADVANCE without printing.

(14) The scanner now steps to Stage 35, the total running price position. Here the action is as before, with the total running price accumulators TRP being gated. This position is printed. The returning STATUS signal steps the scanner again, to Position 36.

(15) Positions 36 through 44 are bill spacing stations only, provided for the purpose of advancing the paper out to its full length before cutting. The spacing bus—LINE ADVANCE, STATUS return routine is used for this group of steps.

(16) When the scanner reaches Stage 45 the system reset circuit is triggered. System reset performs the following functions:

(a) Initiate the paper cutting guillotine.
(b) Clear and reset scanner to 0.
(c) Cleans and resets total running price accumulator TRP to 0.
(d) Reset flip-flop FF20, restoring order circuits and disconnecting printer STATUS signal line from computer by disabling gate AG23.

The computer has completed its action and is ready for new information to be presented.

Various modifications of the various features of the system illustrated and described which are within the spirit and scope of the invention will occur to persons skilled in the art.

What is claimed is:

1. In combination in an ordering, price computing and indicating system, a computer including a plurality of bi-directional ring counter devices one for each of a number of items of predetermined price available for ordering, each ring counter device being adapted to produce and store an output voltage representing the quantity information for its particular item being ordered and having a trigger circuit with an add switch and a subtract switch for entering and removing one of its items respectively each time the switches are closed and a plurality of ordering keys each connected to one of the switches for closing such switch when manually operated, a binary to decimal converter connected to all of the counter devices and controlled to respond on a time sharing basis to the respective output voltages therefrom of a single order for converting the output voltages to respective trains of pulses in number respectively representing the total price of the total number of each item ordered, a plurality of indicators each connected to one of the counter devices and responsive to the quantity information stored therein to indicate the total number of such item to be ordered and to remove such indication when the stored quantity information is provided to the converter, scanning means including gating means connected to the binary to decimal converter and to all the ring counter devices for passing, when the gating means is qualified, stored information from each ring counter device in sequence on a time sharing basis to the binary to decimal converter, command means connected to the scanning means and operable to provide a start command signal to qualify the gating means to pass the stored information from the first counter device of the sequence to the binary to decimal converter, indicator means connected to the converter and responsive to the respective trains of pulses for indicating the total number of each of the items ordered and the total price thereof, the indicator means being connected to the scanning means and having means to provide a step command signal after indicating the total number and price of each one of the items to alter the qualification of the gating means to pass the stored information from the next ring counter device in the sequence to the binary to decimal converter, a plurality of customer ordering stations each having a relay connected to all the add and subtract switches to provide a source of signals thereto when one of the relays is operated, and an interlock to qualify the relays providing a closed path from the relays to the add and subtract switches when a system operator is in contact with the station having a customer operated relay.

2. The system in accordance with claim 1, and a plurality of control circuits connected to the gating means each corresponding to one of the ring counter devices and qualified by the output voltage therefrom when such voltage is being passed by the gating means to produce back order signals, and an amplifier driver connected to the binary to decimal converter and to all of the control circuits for driving such circuits on a time sharing basis for producing back order signals when each of the control circuits is qualified.

3. The system in accordance with claim 1, wherein the command means is operable to provide reset signals and the interlock comprising a transistor having a base, emitter and collector, the emitter-collector path being connected in series between the customer station relays and the add and subtract switches to provide the signal transmission path therebetween, and a flip-flop device connected to the transistor base and to the indicator means and operable in response to the last step command signal therefrom when an order is complete to enable the transistor and qualify the signal transmission path, the flip-flop device being connected to the command means and being operable in response to signals therefrom to enable the transistor and qualify the signal transmission path in response to a reset signal and to disable the transistor and disqualify the signal transmission path in response to a start command signal.

4. The system in accordance with claim 1, and accumulator means connected to the binary to decimal converter to receive and store each train of pulses, gate means connected to the accumulator and indicator means to control transmission of signals therebetween and connected to all the ring counter devices and selectively qualified by each when the stored information is no longer present therein to pass stored decimal pulse information from the accumulator means to the indicator means.

No references cited.

ROBERT C. BAILEY, *Primary Examiner.*

I. S. KAVRUKOV, *Assistant Examiner.*